United States Patent
Hellman

(10) Patent No.: US 7,032,933 B2
(45) Date of Patent: Apr. 25, 2006

(54) PIPE CONNECTING DEVICE

(75) Inventor: Fredrik Hellman, Norrkoping (SE)

(73) Assignee: AB Faluplast, Falun (SE)

( * ) Notice: Subject to any disclaimer, the term of this patent is extended or adjusted under 35 U.S.C. 154(b) by 111 days.

(21) Appl. No.: 10/451,752

(22) PCT Filed: Dec. 20, 2001

(86) PCT No.: PCT/SE01/02859

§ 371 (c)(1),
(2), (4) Date: Nov. 3, 2003

(87) PCT Pub. No.: WO02/50466

PCT Pub. Date: Jun. 27, 2002

(65) Prior Publication Data

US 2005/0046190 A1   Mar. 3, 2005

(30) Foreign Application Priority Data

Dec. 21, 2000 (SE) .................................... 0004774

(51) Int. Cl.
*F16L 17/00* (2006.01)
(52) U.S. Cl. .................. 285/105; 285/3; 285/382.4; 285/334.1; 285/357
(58) Field of Classification Search ............... 285/3, 285/4, 382.4, 332.1, 334.1, 245, 246, 231, 285/338, 216, 196, 357, 105
See application file for complete search history.

(56) References Cited

U.S. PATENT DOCUMENTS

| 922,544 | A | * | 5/1909 | Turner et al. | ........... 285/148.23 |
| 2,132,636 | A | * | 10/1938 | Maahs | ......................... 285/208 |
| 2,813,568 | A | * | 11/1957 | Kilmarx, Jr. | ................... 285/3 |
| 3,058,760 | A | * | 10/1962 | Bankowski | ................. 285/196 |
| 3,340,762 | A | * | 9/1967 | Bennett | ........................ 285/3 |
| 3,689,038 | A | * | 9/1972 | Martin | ........................ 285/338 |
| 3,879,065 | A | * | 4/1975 | Kobayashi | ................... 285/338 |
| 4,627,647 | A | * | 12/1986 | Hauff | ......................... 285/196 |
| 4,768,560 | A | * | 9/1988 | Logsdon | ...................... 138/90 |
| 6,557,825 | B1 | * | 5/2003 | Stone et al. | ................. 285/338 |

FOREIGN PATENT DOCUMENTS

DE              597771         10/1929

* cited by examiner

*Primary Examiner*—David Bochna
(74) *Attorney, Agent, or Firm*—Rolf Fasth; Fasth Law Offices

(57) ABSTRACT

A pipe connecting device designed for detachable, sealing assembly of two pipe ends which device consists of an outer part and an inner part inserted axially into the outer part and cooperating therewith for internal connection to the first pipe end. The cooperating contact surfaces of both the inner part and the outer part are conical in shaped. Furthermore, means are arranged to prevent axial movement between the conical contact surfaces.

8 Claims, 3 Drawing Sheets

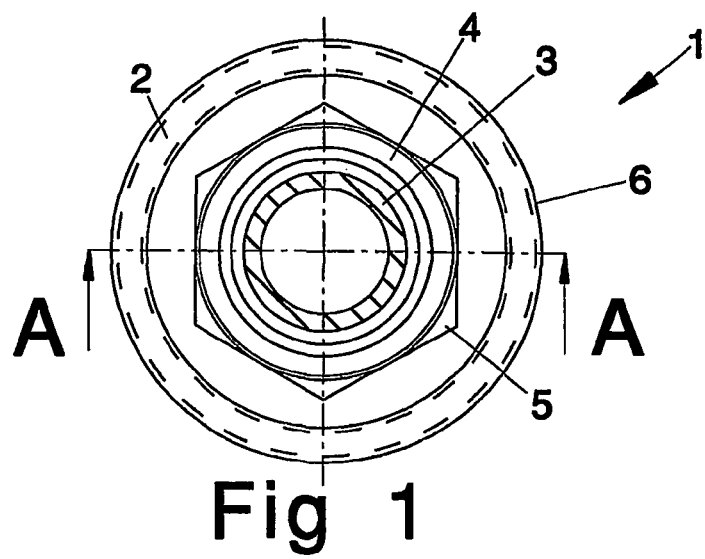
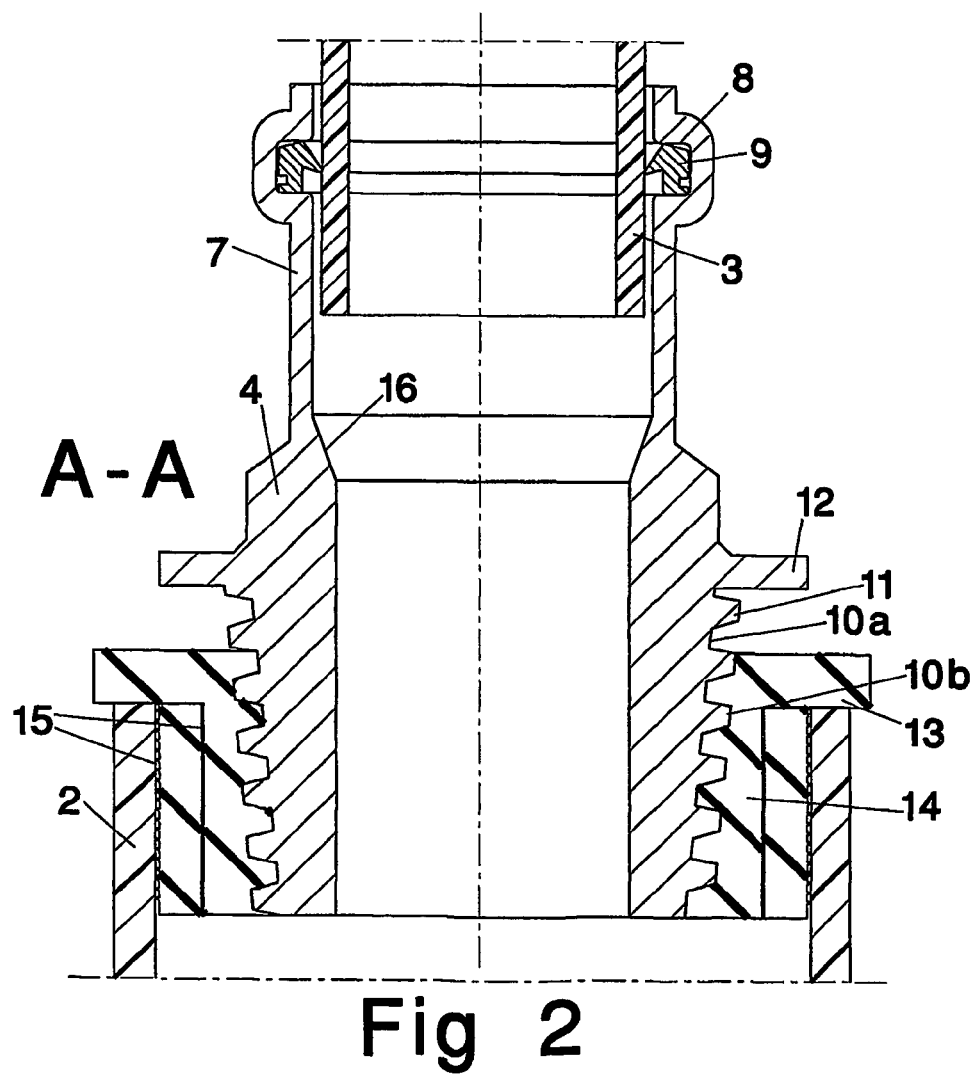

PIPE CONNECTING DEVICE

PRIOR APPLICATION

This application is a U.S. national phase application based on International Application No. PCT/SE01/02859, filed 20 Oct. 2001, claiming priority from Swedish Patent Application No. 0004774-6, filed 21 Dec. 2000.

TECHNICAL FIELD

The present invention relates to a sealing connecting device for joining two pipe ends.

BACKGROUND ART

Connecting devices for sealing connection between two pipe ends have previously been used which have an internal diameter fitting the outer diameter of one of the pipe ends and an external diameter fitting the inner diameter of the other pipe end. These seals must therefore be manufactured with tolerances in relation to the diameters of the pipes to be joined, which means that very many seals must be available in order to provide connections between pipe ends of varying diameters.

It is also known through U.S. Pat. No. 3,913,928, for instance, to use one and the same connecting device to join a pipe of a specific diameter to another pipe of a specific diameter, where this second pipe can assume one of two possible diameters. In this case the connecting device is provided with a collar that can be peeled back over the device so that it assumes a larger outer diameter. This type of connecting device must also be manufactured with tolerances in relation to the pipes and many devices are required to cover many ratios between diameters.

Also known through SE patent 9600828-9 (510 262) is a flexible nipple, a so-called combination nipple, by means of which a first pipe is connected to a second pipe, the first pipe assuming one of two possible diameters and the other pipe also assuming one of two possible diameters. However, this type of connecting device must also be manufactured with tolerances to enable connection to specific pipe diameters. One variant of said combination nipple is manufactured, for instance, under the designation 75-70/50-40 and another under the designation 64-58/50-40 signifying D1-D2/d1-d2 which means D1 or D2 connected to d1 or d2.

Difficulties are thus encountered with these known connecting devices in joining a first pipe to a second pipe, using the same connecting device, where the diameter of one of the pipes is permitted to lie within an interval rather than having a specific value. It also is difficult to obtain a tight connection to a pipe end that is not entirely circular.

OBJECT OF THE INVENTION

The object of the present invention is to solve the above problems and to provide a pipe connecting device for a sealing fit between two pipe ends, which device enables stepless adaptation of the device within an interval of pipe diameters.

Another object of the present invention is in a better way than previously to achieve a tight seal between two pipe ends by expanding a pipe connecting device towards the inner surface of a pipe end.

The object of the present invention is also to achieve a tight seal to a pipe end that is not entirely circular, i.e. may be slightly oval.

SUMMARY OF THE INVENTION

The above objects are fulfilled by means of the present invention as revealed in the characterizing parts of the claims, and said drawbacks are eliminated.

The invention relates to a pipe connecting device designed for detachable, sealing assembly of two pipe ends. The device consists of an inner part and an outer part co-operating with the inner part for internal connection to one of the pipe ends. The co-operating contact surfaces of the inner part and the outer part are conical in shape. Means are also arranged to prevent axial movement between the conical contact surfaces. These means preferably comprise the two conical contact surfaces being provided with a co-operating thread profile having trapezoidal shape, for instance.

Two pipe ends are joined by inserting one end of the inner part axially into the outer part of the connecting device. Thereafter the outer part of the connecting device is inserted into the first pipe end, whereafter the inner part is pressed, e.g. screwed into the outer part in order to expand the outer part towards the inner surface of the first pipe end. A second pipe end is then connected in a first embodiment to the other end of the inner part which is designed, e.g. with a lip ring seal in a sealing groove, to take the pipe end.

In a second embodiment the outer part is provided with an inner sealing sleeve rigidly attached to the outer part, against which sleeve an inner pipe end, i.e. with smaller diameter, seals when the inner part of the connecting device is pressed down into a narrowing space between the outer part and its rigidly attached sealing sleeve by means of a screwing movement, for instance.

Within the scope of the invention the other end of the inner part may also be provided with a corresponding outer part having mutually co-operating conically threaded contact surfaces for internal connection to a second pipe end. The inner part may also be bent in order to join pipe ends whose axes are not parallel. The means preventing axial movement between inner and outer parts may also be in the form of external clamping means or, quite simply, may consist of a glue joint.

The pipe connecting device in accordance with the invention is preferably used when joining waste pipes in joists or in concrete. The main area of application for pipe connecting devices in accordance with the invention is when connecting a new waste pipe in an existing waste pipe made of cast iron. These old waste pipes often vary considerably in dimension.

BRIEF DESCRIPTION OF THE DRAWINGS

The invention will now be described in more detail with reference to the accompanying drawings.

FIG. 1 shows an end view of a pipe connecting device in accordance with the present invention.

FIG. 2 shows an enlargement of a section alone the line A—A through the pipe connecting device in FIG. 1, with the addition of two pipe ends.

DESCRIPTION OF THE INVENTION

Figure 3:
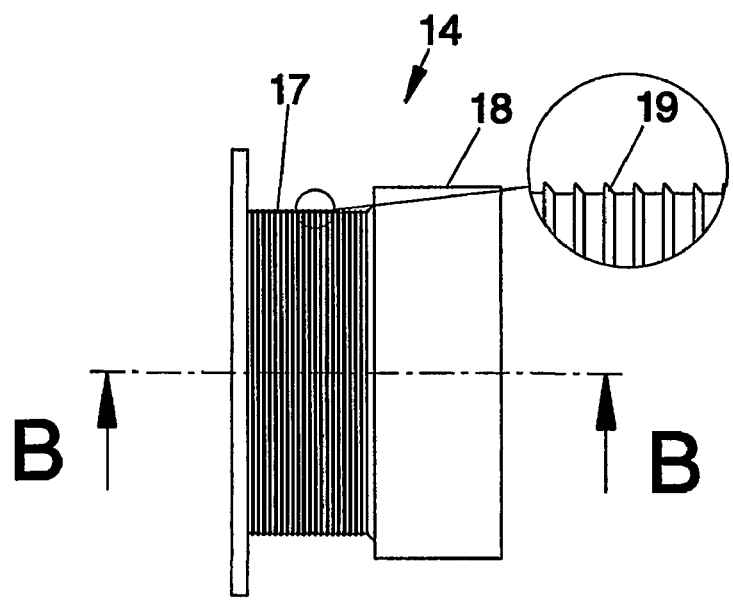
FIG. 3 shows an outer part of the pipe connecting device in accordance with the invention, and a detail of the surface of the outer part.

FIG. 1 shows an end view of a pipe connecting device 1 for joining a first pipe end 2 to a second pipe end 3. The second pipe end 3 is inserted axially into an inner part 4 of the pipe connecting device 1. The inner part 4 is also provided with a key handle 5 intended for turning the inner part 4 in relation to an outer part 6 of the pipe connecting device.

FIG. 2 shows the pipe connecting device in an axial section, the second pipe end 3 being inserted in a neck portion 7 of the inner part 4 of the pipe connecting device. The neck portion is provided with a sealing groove 8 in which a lip seal 9 is situated, constituting a gas seal for slight pressure in the direction of the first pipe end. The inner part of the pipe connecting device is provided at the other end with a conical outer surface 10a, narrowing towards the bottom, which is provided with a trapezoidal thread 11. The surface 10a terminates in an annular central flange 12, towards the middle of the inner part.

An outer part 14, provided with an annular end flange 13, is also arranged having a conical inner surface 10b co-operating with the conical outer surface 10a of the inner part. The conical inner surface 10b of the outer part is also provided with trapezoidal threading corresponding to the inner part. The cylindrical outer surface 15 of the outer part abuts directly, or indirectly as shown in FIG. 2, against the first pipe end 2. The inner part is also provided with an internally narrowing neck portion 16 arranged so that one inner diameter of the inner part is the same as the inner diameter of the other pipe end 3.

The function of this construction is that screwing the inner part 4 into the outer part 14 causes the outer part to expand steplessly radially, whereupon the connecting diameter of the outer part can be varied within an interval. This expansion also equalises any ovalness in the pipe end.

FIG. 3 shows the outer part 14 which, according to the present embodiment, consists of a primary part 17 and a secondary part 18 with one end concentrically connected to one end of the primary part. The figure also shows, partly enlarged, that the outer surface of the primary part 17 is provided with wedge-shaped sealing rings 19. The inner surface of the secondary part 18 is also provided with wedge-shaped sealing rings.

Figure 4:
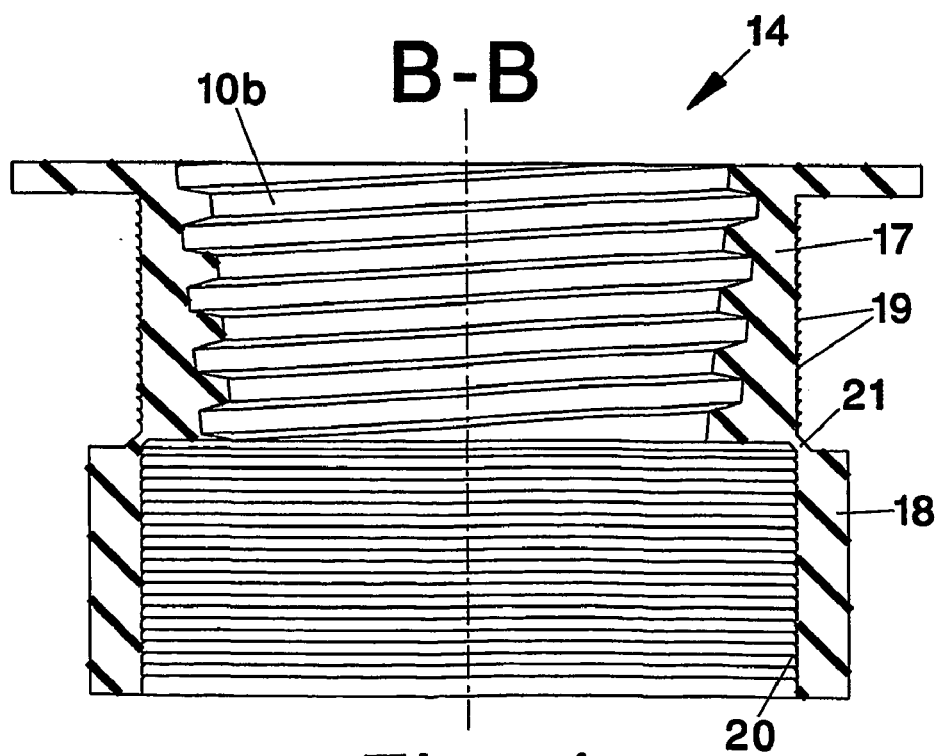
FIG. 4 shows a section B—B through the part shown in FIG. 3.

FIG. 4 shows the primary part 17 of the outer part enlarged in an axial section which clearly shows the inner conical surface 10b of the outer part, provided with trapezoidal threading. Its outer surface also shows the wedge-shaped sealing rings 19. The figure also shows the wedge-shaped sealing rings 20 on the inner surface of the secondary part 18. The primary part 17 passes via a breaking ring 21 to the secondary part 18. The secondary part 18 has an inner diameter that is equal, or substantially equal, to the outer diameter of the primary part 17. The secondary part 18 also has an outer diameter that is greater than the outer diameter of the primary part 17. The secondary part 18 is thus intended to be folded back over the primary part in order to achieve an expansion interval with larger diameter. The secondary part can easily be removed by cutting it off in order to adapt the connection to an expansion interval with smaller diameter. This design of the outer part enables stepless connection of the outer part to the other pipe end in an interval of inner diameters between a minimum corresponding to the outer diameter of the primary part of the outer part at rest, and a maximum corresponding to the secondary part of the outer part expanded. The outer part can thus be used for two diameter intervals which overlap each other, i.e. 65–75 mm and 73–83 mm.

To connect a first pipe end 2 to a second pipe end 3, the inner part 4 is first screwed about half way into the outer part 14, after which the inner part, together with the outer part, is introduced into the first pipe end 2. Thereafter, the outer part 14 is expanded towards the inner surface of the pipe end 2 by the inner part 4 being screwed further into the outer part 14. The second pipe end 3 is then inserted into the other end of the inner part, past the lip seal 9 and the connection is then complete. Alternatively, the second pipe end 3 is inserted into the other end of the inner part 4 before the outer part 14 is inserted and expanded. The method used is dependent on how flexible the pipes are. After assembly, it is the expanded side of the pipe connection which is the most fixed connection, whereas the pipe that is inserted past the lip seal can be displaced axially.

Figure 5:
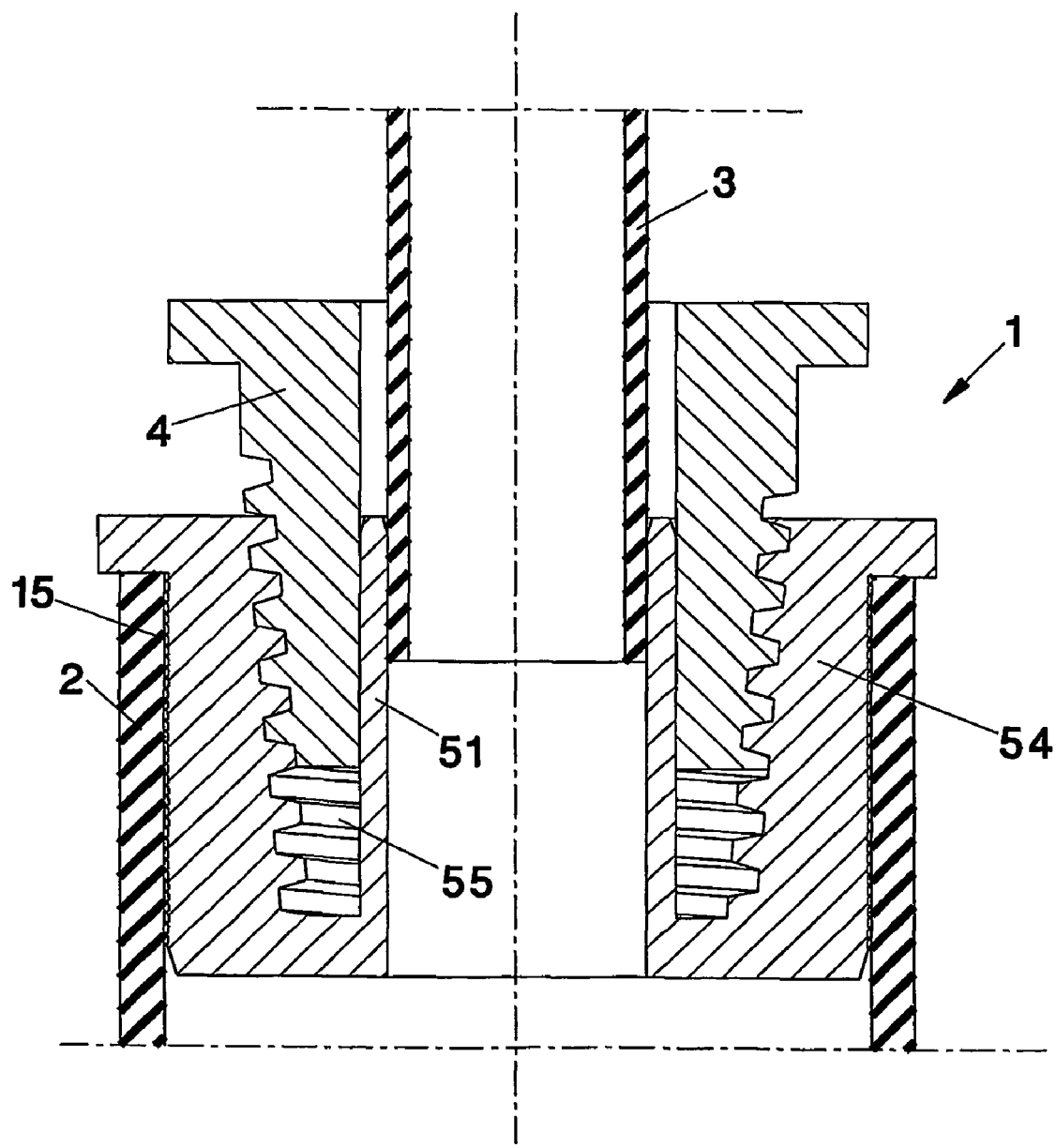
FIG. 5 shows a section corresponding to FIG. 2 in accordance with a second embodiment of the present invention.

FIG. 5 shows a second embodiment of the invention in which the pipe connecting device 1 is arranged, in similar manner to that described above, so that its outer surface 15 connects with the first pipe end 2 with large diameter, and the pipe connecting device is also provided with an inner sealing sleeve 51 to connect with the second pipe end 3. The inner sealing sleeve 51 is rigidly joined to the outer part 54 of the pipe connecting device so that a conical space 55 is formed in the outer part. As described above the outer surface of the outer part is expanded towards the inner surface of the first pipe end when the inner part 4 of the pipe connecting device is pressed, e.g. screwed, down into the outer part 54. The inner sealing sleeve 51 is simultaneously pressed inwardly towards the second pipe end 3. A tight joint has thus been achieved between two pipe parts 2, 3 of different diameters.

The invention claimed is:

1. A pipe connecting device (1) designed for detachable, sealing assembly of two pipe ends (2, 3), which device consists of an outer part (14, 54) and an inner part (4) inserted axially into the outer part (14, 54) and co-operating therewith, which inner part (4) on its inside direct or indirect is connected to the first pipe end (3), the co-operating contact surfaces (10a, 10b) of both the inner part (4) and the outer part (14, 54) being conical in shape, and means (11) being arranged to prevent axial movement between the conical contact surfaces (10a, 10b), that the means (11) preventing axial movement comprise the two conical contact surfaces (10a, 10b) being provided with a co-operating thread profile, characterized in that the outer part (14, 54) is arranged to expand radially to internal attachment towards the other pipe end (2) by screwing the inner part (4) into the outer part (14, 54), the outer part (14) comprises a primary part (17) and a secondary part (18), one end of which is concentrically connected via a breaking ring (21) to one end of the primary part (17).

2. A pipe connecting device as claimed in claim 1, characterized in that the device accommodates pipe ends (2, 3) of different diameters and that the pipe end (3) with the smallest diameter is arranged to be connected internally to the inner part (4) and the pipe end (2) with the largest diameter is arranged to be connected externally to the outer part (14).

3. A pipe connecting device as claimed in claim 2, characterized in that the thread profile is trapezoidal in appearance.

4. A pipe connecting device as claimed in claim 1, characterized in that the device is designed for connection to pipe ends (2, 3) with parallel central axes.

5. A pipe connecting device as claimed in claim 1, characterized in that the outer diameter of the primary part (17) is smaller than the outer diameter of the secondary part (18).

6. A pipe connecting device as claimed in claim 5, characterized in that the inner diameter of the secondary part (18) is the same size as the outer diameter of the primary part (17).

7. A pipe connecting device as claimed in claim 1, characterized in that the outer surface of the primary part (17) and the inner surface of the secondary part (18) are both provided with wedge-shaped sealing rings (19, 20).

8. A pipe connecting device as claimed in claim 1, characterized in that the outer part (54) of the device is provided with an inner sealing sleeve (51) so that a conical space (55) co-operating with the inner part (4) is situated between the sealing sleeve (51) and the outer surface (15) of the outer part (54).

\* \* \* \* \*